Sept. 20, 1971   A. G. FOSTER   3,605,468
MACHINE FOR APPLYING LOADS TO A TEST SPECIMEN
Filed Feb. 28, 1969   3 Sheets-Sheet 1

INVENTOR
ARLAND G. FOSTER

BY *Ben Cohen*
ATTORNEY

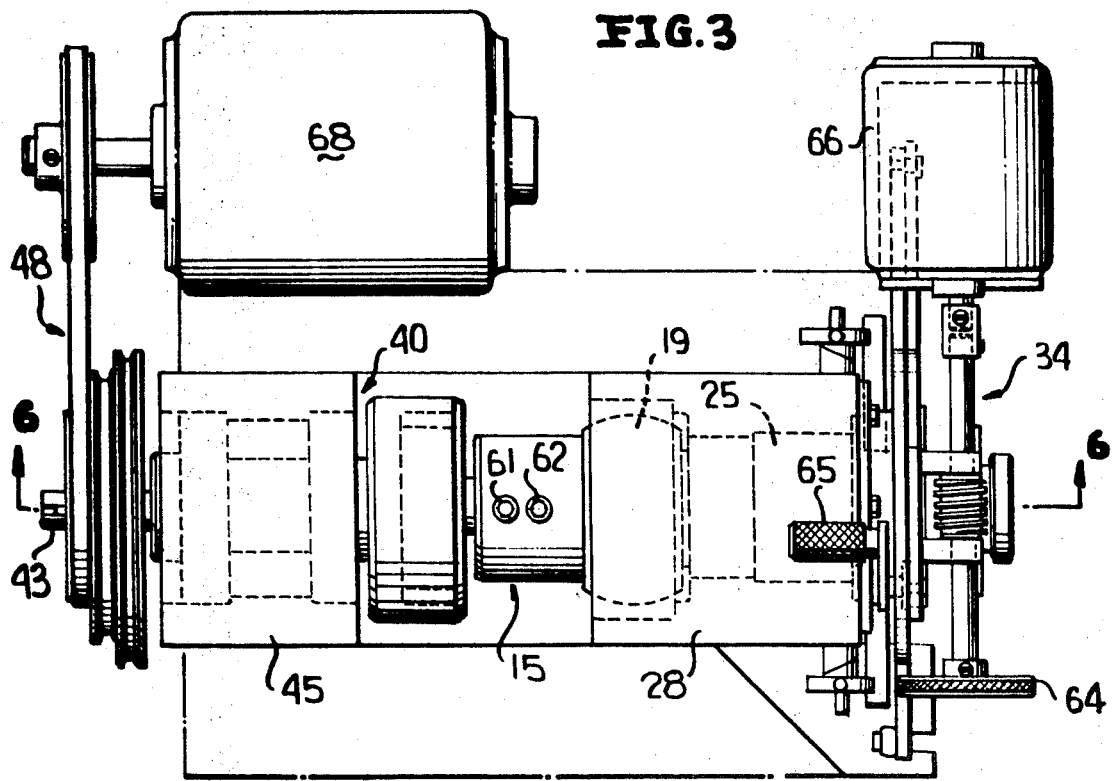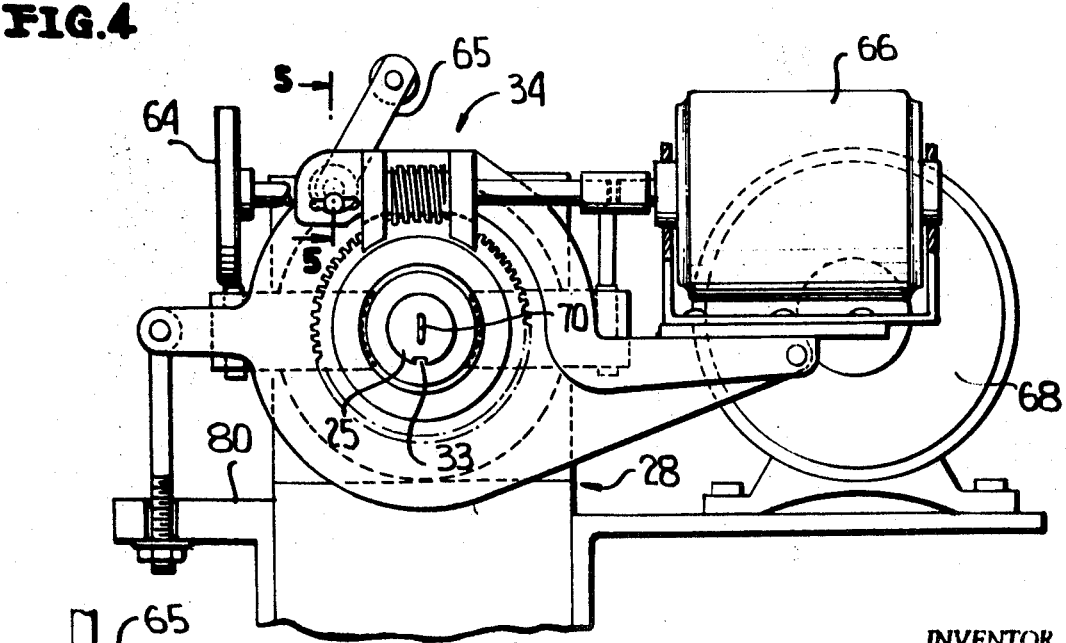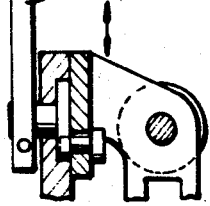

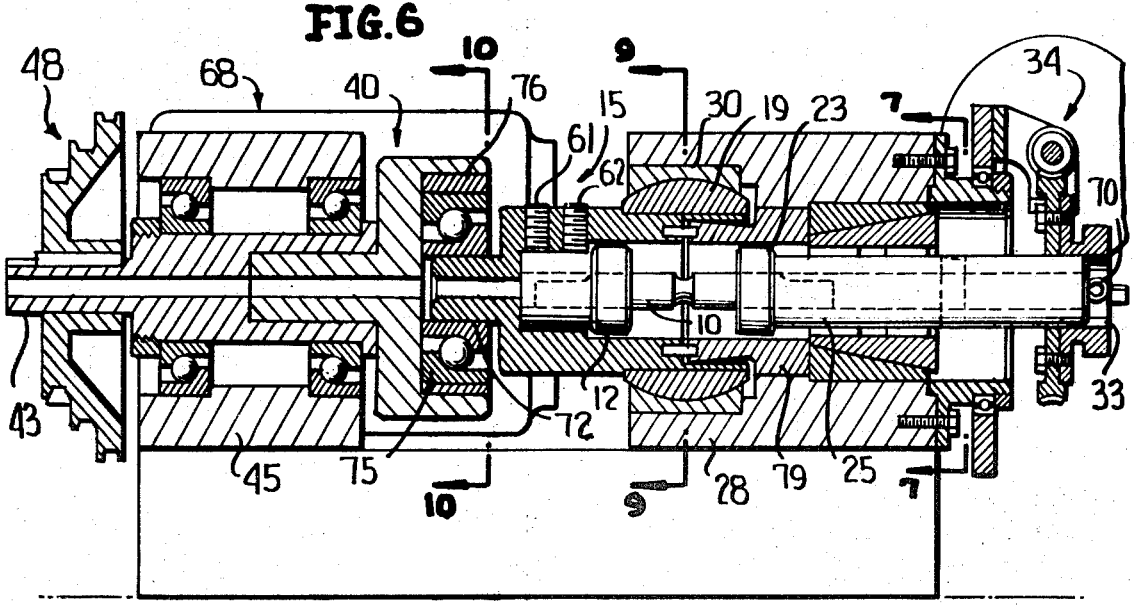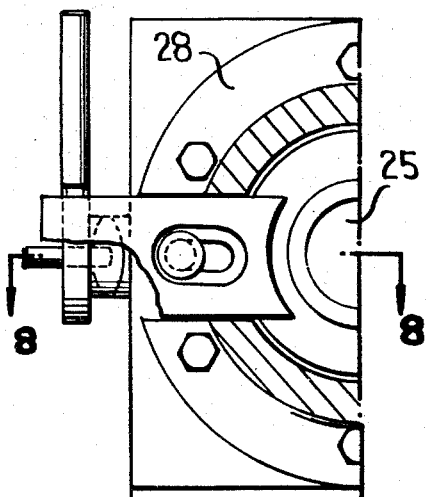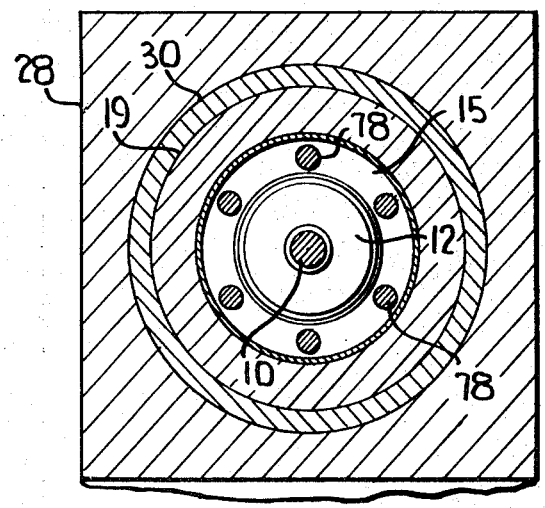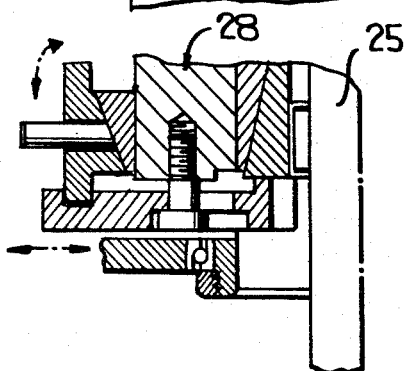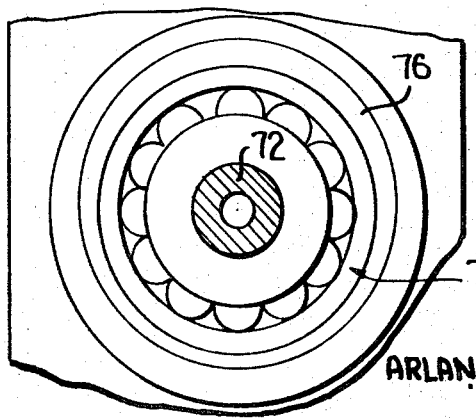

United States Patent Office

3,605,488
Patented Sept. 20, 1971

3,605,488
MACHINE FOR APPLYING LOADS TO A TEST SPECIMEN
Arland G. Foster, Rte. 9, Box 949, Tucson, Ariz. 85705
Filed Feb. 28, 1969, Ser. No. 803,333
Int. Cl. G01n 3/20
U.S. Cl. 73—100                                                                                4 Claims

ABSTRACT OF THE DISCLOSURE

A test specimen is subjected to a pure bending load by applying to the specimen a rotating load transverse to the axis thereof, and holding the specimen against rotation during application of the rotating load while permitting the specimen to undergo wobble in reaction to the load. The specimen may also be subjected to axial loads (tension or compression) and torsional loading independently of one another and of the bending load, so that any combination of these loads may be applied to the specimen at will.

BACKGROUND OF THE INVENTION

The present invention relates generally to apparatus for testing the strength of materials, and more particularly to apparatus for subjecting a test specimen composed of the material under consideration to stresses produced by a pure rotating bending load and/or to other loads such as tension, compression, and torsion without interaction between the media by which the various loads are applied.

Heretofore, insofar as I am aware, apparatus for subjecting a test specimen to a rotational load has required that the specimen itself be rotated, thus leading to significant problems of instrumenting the specimen in order to obtain the desired measurements or to observe the effects of the stresses so produced. Moreover, the prior art testing apparatus has been incapable of producing simultaneous loading of the specimen or sample in bending, tension or compression, and torsion, without interaction between the various media by which such loads are applied. Obviously, if different types of loading are not applied to the specimen idependently of one another, the results obtained are something less than an accurate indication of behavior of the material of which the specimen is composed in practical situations other than that where precisely the same interdependence of loading is involved.

It is therefore a principal object of the present invention to provide test apparatus and methods by which a test specimen may be subjected to a rotating load without itself undergoing rotation; and it is an ancillary object of the invention to incorporate into such apparatus and methods the means and techniques by which other types of loading may be applied to the specimen independently of one another and of the rotating load.

SUMMARY OF THE INVENTION

Briefly, according to the present invention, the specimen is clamped at one of its ends to a support member arranged to have freedom of movement in either direction parallel to the axis of the specimen, or substantially parallel thereto, and is clamped at the other of its ends to another support member which is itself maintained in a bearing in a rotatable member to permit rotation of the latter member without rotation of the former member. The bearing element has its axis offset from that of the first-mentioned support member, and thus the support member maintained in the bearing is driven through a circular path at the point of contact with the bearing, as the rotatable member is rotated. The result is the application of a rotating transverse (bending) load on a nonrotating specimen, which in effect simulates a constant bending load on a rotating specimen. Clearly, however, the former is much simpler to instrument than the latter.

Axial loads and torque may be applied independently of one another to the axially movable support member, and thus to the specimen, without interference with application of the rotating bending load on the specimen.

BRIEF DESCRIPTION OF THE DRAWINGS

The above and still further objects, features, and advantages of my invention will become apparent from a consideration of the following detailed description of a preferred embodiment thereof, especially when taken in conjunction with the accompanying drawings, in which:

FIG. 3 is a plan view of apparatus suitable for performing the function of the system of FIG. 1;
FIG. 4 is an end view taken from the right hand side of the apparatus of FIG. 3;
FIG. 5 is a fragmentary sectional view taken along the lines 5—5 of FIG. 4;
FIG. 6 is a sectional view taken along the lines 6—6 of FIG. 3;
FIGS. 7, 9 and 10 are sectional views taken along correspondingly numbered lines of FIG. 6;
and
FIG. 8 is a fragmentary sectional view taken along the lines 8—8 of FIG. 7.

DESCRIPTION OF THE PREFERRED EMBODIMENT

Figure 1:
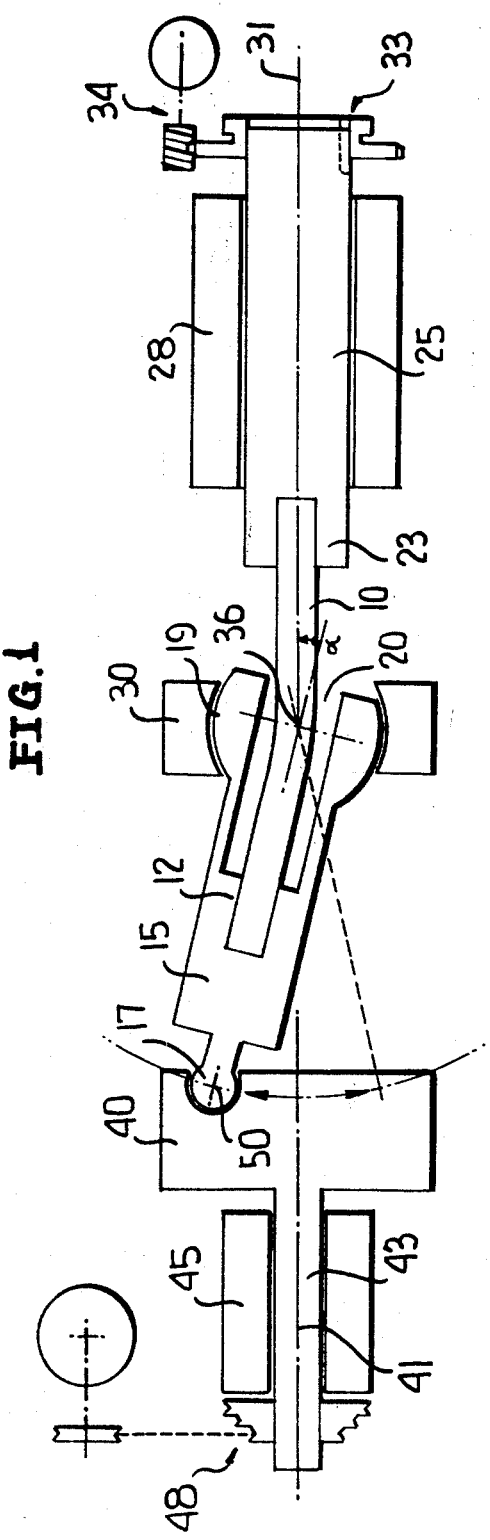
FIG. 1 is a mechanical schematic diagram of a system in accordance with my invention.

With reference initially to the mechanical schematic diagram of FIG. 1, the test specimen 10 is secured at one of its ends by locking within a chuck 12 associated with swivelable member 15. The latter is pivotally coupled at one end in a ball-and-socket joint, or universal bearing 17 and at its other end in another ball-and-socket joint, or universal bearing 19. Member 15 contains a recess or cavity 20 from which specimen 10 projects, the width or diameter of cavity 20 (i.e., the separation between its longitudinal walls) being such that there is an absence of contact between member 15 and specimen 10 except at those end points at which the specimen is locked within chuck 12. This absence of physical contact should exist throughout the subjection of the test specimen to forces or stresses, to prevent inaccurate determination of the strength of the material of which the specimen is composed, as well as inaccuracy of other measurements, which would otherwise be obtained.

At its other end, specimen 10 is secured in a chuck 23 associated with a member 25 which is arranged and adapted to be translatable as well as rotatable within a fixed support or collar 28. Both collar 28 and socket bearing 30 of ball-and-socket joint 19 are rigidly fastened to the frame of the testing machine in which the desired tests and measurements are to be carried out. To permit sliding (translation) along axis 31 and rotation about axis 31, member 25 is keyed, as generally indicated by reference number 33, to a portion of the conventional gearing arrangement generally designated by reference number 34.

As will be observed from FIG. 1, specimen 10 is sufficiently flexible to undergo bending at or about point 36, this occurring as a result of the orientation of the longitudinal axis of member 15 at an angle α relative to axis 31 of member 25, and of the fact that the specimen is fastened at its respective ends to these two members. The socket bearing of ball-and-socket joint 17 resides within a rotatable member 40 whose longitudinal axis of rotation 41 preferably (but not necessarily) coincides with axis 31 of member 25. The neck portion 43 of member 41 extends through a support 45 which may be adjustably mounted to the frame of the testing machine, and is fastened at its free end to a pulley system, generally designated by reference number 48, to permit controlled rotation including control of velocity of that rotation of member 40.

It will be observed that upon rotation of member 40, the ball bearing of joint 17 is carried in a circular path about axis 41, and with it, member 15 moves through a conical path subtended by an angle $\alpha$. It will further be noted that member 15 (and hence, specimen 10) does not rotate with rotation of member 40, but rather, simply describes the surface of a cone, by virtue of the pivotal or swivelable coupling afforded by ball-and-socket joint 17. Accordingly, test specimen 10 moves in a similar path and in so doing is subjected to a rotating bending load. It is important to realize that while the specimen itself does not rotate, it does undergo movement that produces this rotating bending load upon it, and that this in turn simulates a constant bending load on a rotating specimen. The significance of this fact is evident in the capacity to physically instrument the test specimen in a manner much more simple than is possible with a rotating specimen, to determine such factors as strain, fatigue, temperature variations, changes in electrical and magnetic properties, and so forth.

The motion of member 15, and of specimen 10, is centered about point 36, the center of ball-and-socket joint 19. If desired, as will generally be the case, additional loads may be applied to the test specimen, in any combination, through specimen holder 25. Tensile or compressive loads may be applied by appropriate application of the respective properly directed force on the far end of member 25, parallel to axis 31. Torsion is likewise applied to the specimen by application of torque to member 25 via gearing system 34. The magnitude of the bending load on test specimen 10 is readily varied by adjusting the eccentricity of member 40 relative to the axis of member 25.

Slight consideration of the above described structure and operation will readily reveal that the specimen may be subjected to combined loadings to permit the following tests to be performed: (1) dynamic bending fatigue tests (i.e., subjection to rotating bending load) with (a) no additional load, (b) constant torsion, (c) constant tension, (d) constant compression, (e) constant torsion and constant tension, (f) constant torsion and constant compression; or (2) static tests (i.e., no rotating bending load applied) of (a) tension, (b) compression, (c) torsion, (d) combined torsion and tension, (e) combined torsion and compression.

Figure 2:
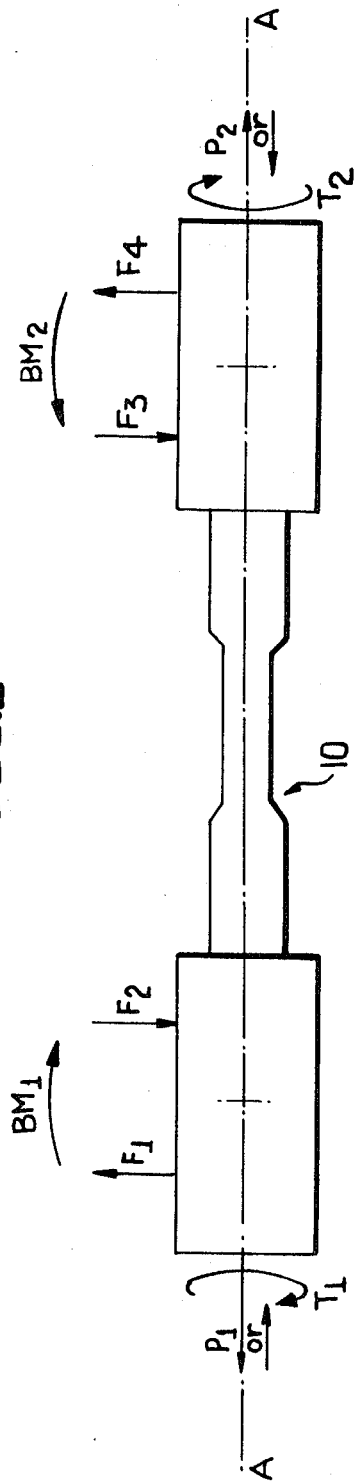
FIG. 2 is a schematic diagram of the forces applied to a specimen within the system of FIG. 1.

The forces (and moments) exerted on the test specimen may be examined by reference to the simplified schematic force diagram of FIG. 2. When inserted into position in the test machine, the test specimen is subjected to a pair of couples designated by force set F, and $F_2$ and force set $F_3$ and $F_4$, producing a pair of bending moments $BM_1$ and $BM_2$ which result in a pure bending load on specimen 10. As previously observed, upon rotation of member 40 the two force sets $F_1$, $F_2$ and $F_3$, $F_4$ are rotated in circular fashion about axis A—A (FIG. 2), thereby rotating the two bending moments about the specimen and producing a cyclic, completely reversed bending load on the specimen, as though it were being rotated under a stationary bending load. The distance between point 50, the center of ball-and-socket joint 17, and axis 41 of member 40 as depicted in FIG. 1 is substantially exaggerated for the sake of clarity to the reader. In practice, this distance is usually quite small, having ranged from 0.010 inch to 0.050 inch depending upon adjustment of member 40, in one actually constructed embodiment of my invention. Angular velocity of member 40 is typically from 100 revolutions per minute (r.p.m.) to 20,000 r.p.m. It will be understood, of course, that these specific magnitudes of deflection and angular velocity, as well as other values that may from time to time appear herein, are set forth purely for the sake of example. Other values are entirely possible and may well be desirable depending upon the specified conditions of test and the composition of the test material. It will be apparent from the above, however, that the bend in specimen 10 is depicted in FIG. 1 is also exaggerated.

Referring again concurrently to FIG. 2, the torques designated $T_1$ and $T_2$ at either end of the specimen (or the specimen holders) may be applied, for example, by the use of gear system 34 or of a lever (not shown) to effect rotation of member 25, and thus of specimen 10, a few degrees in either direction about axis A—A. Such rotation of the right hand end of the specimen, as viewed in FIGS. 1 and 2, while preventing rotation of the left hand end, produces a constant torsional stress on the specimen, and this stress remains constant despite any rotation of member 40. If desired, the apparatus for applying the torque may be adapted, by conventional techniques, to provide an oscillating torque.

Axial loads $P_1$ and/or $P_2$ are applied to the specimen to produce either compressive or tensile loads, depending on direction of the force, on the specimen. Such forces may be produced by mechanical, hydraulic, magnetic or any other suitable means, using conventional techniques, operating on the free end of member 25; and are readily provided as a direct result of the capability of member 25 to undergo translation (i.e., to slide within support 28) as well as rotation. Here again, the forces or force may be applied in oscillating fashion, to produce alternation of loading on the specimen from tension to compression, and so forth. During application of such forces on the right hand end of the test specimen, the left hand end is maintained within a fixed plane along the longitudinal axis of the device as a result of the longitudinal restraint imposed by ball-and-socket joint 19.

As previously explained, the pure bending load, the torsional load, and the axial load (tension or compression) may be applied independently of one another, that is to say, without interfering reactions, and therefore may be applied to the specimen either separately or in any desired combination, depending upon properties and measurements to be ascertained from the tests to be concluded.

Having described the general structure and operation of my invention, a more specific description of structure will now be presented with reference to the remaining figures of drawing, FIGS. 3 through 10 inclusive. Specific figures will be designated only in those portions of the ensuing description where clarity will be measurably enhanced thereby.

Specimen 10 has one of its ends inserted into chuck 12 of member 15, and after tightening the chuck, a pair of set screws 61, 62 is similarly tightened to ensure that the specimen is securely locked to member 15. A similar procedure is followed with respect to the other end of the specimen and chuck 23 of member 25, except that no set screws are used. A handwheel 64 is utilized to apply a selected degree of torque to member 25 via gearing system 34 (FIG. 4) and this torque is then maintained by operation of a locking lever 65. Alternatively, the locking lever may be shifted to a position in which specimen holding member 25 is unlocked angularly (note that longitudinal sliding of member 25 is always permissible), and an oscillatory torsional load applied to the specimen by periodic reversal of the motor 66 coupled to gearing system 34.

Another motor, 68, is utilized to produce rotation of member 40 at a speed dependent upon the position of the belt on variable pulley drive system 48.

Axial loading of the test specimen in tension may be applied by application of an outwardly directed force via a wire rope, for example, fastened to a loop lug 70 (FIGS. 4 and 6) connected to the end of member 25. Compressive force may be applied by use of a force directed against the end of member 25.

The necked-down end 72 of member 15 rides within a bearing 75 differing from the ball-and-socket bearing 17 depicted in FIG. 1. However, the same operation as previously described is achieved by setting bearings 75 in an eccentric collar 76 (FIGS. 6 and 10), to offset the axis of member 15 (and thus, of specimen 10) slightly from the axis of member 40. Variation of the extent of eccentricity, of course, is effected to produce a corresponding variation of this offset or deflection of specimen 10.

Metal pins 78 are mounted in a circle at the end of member 15 remote from member 40 (see FIGS. 6 and 9), the pins equiangularly spaced from one another in 60° increments and project into a corresponding number of slightly oversize holes in a rigidly mounted member 79 (FIG. 6), to prevent rotation of member 15. This explains the retention of a selected torque on the specimen by application via the end of member 25, for otherwise, rotation of the latter to any degree would simply result in corresponding rotation of member 15 and thus loss of the torsional stress on the specimen. On the other hand, the bearings do permit member 15, and with it, specimen 10, to undergo wobble in a circular path for subjection to the previously described pure bending load.

It is believed that the remaining structural characteristics, none of which are critical to the practice and/or use of my invention, are evident from a consideration of the several figures, and that further discussion of such details is unnecessary to the understanding of the invention by a person in the art to which my invention pertains. It is sufficient to again emphasize that since the test specimen does not rotate, instrumentation of the specimen is greatly simplified, and this represents a significant advance in the state of the art.

I claim:

1. Apparatus for applying forces to a test specimen, comprising:
    means for subjecting said specimen to a rotating transverse load tending to produce pure bending thereof at every point about the axis of said specimen, thereby simulating a continuous bending load on a rotating specimen,
    means for preventing said specimen from rotating during subjection thereof to said rotating bending load while permitting said specimen to undergo wobble as a result of the application of said rotating bending load, and
    further including means to permit application of axial loads and torsional loads to said specimen independently of each other and said bending load, whereby said specimen may be simultaneously subjected to any combination of tension or compression, torsion and bending during a given interval of time.

2. The invention according to claim 1 wherein said means for subjecting said specimen to a rotating transverse load comprises a rotatable driving member to be coupled to said specimen to produce axial deflection of one end thereby relative to the axis of said driving member; and wherein said means for preventing rotation and permitting wobble of said specimen comprises a driven member for eccentrically coupling said specimen at one of its ends to said driving member, said driven member supported at either end thereof in bearing means allowing captive pivoting of said driven member relative to said axis and free of forces exerted by said driving means tending to produce rotation about said axis, and an axially translatable and rotatable support member for holding the other end of said specimen.

3. The invention according to claim 2 wherein said means to permit application of axial loads and torsional loads to said specimen includes means to permit application of force in a direction parallel to said axis on one end of said support member tending to produce axial translation thereof, a collar encompassing said support member in axially free and rotationally locked relationship therewith, and means for selectively rotating said collar.

4. The invention according to claim 3 wherein said means to permit application of axial and torsional loads to said specimen comprises reciprocation means for periodic reversal of said loads in oscillatory fashion.

References Cited

UNITED STATES PATENTS

| | | | |
|---|---|---|---|
| 1,193,686 | 8/1916 | Heisler | 73—91 |
| 2,657,573 | 11/1953 | Castricum | 73—100 |
| 2,735,295 | 2/1956 | Piety | 73—100 |
| 3,180,137 | 4/1965 | Tannenberg | 73—100 |

RICHARD C. QUEISSER, Primary Examiner

J. WHALEN, Assistant Examiner

U.S. Cl. X.R.

73—93